(12) United States Patent
Wshah et al.

(10) Patent No.: US 9,374,501 B2
(45) Date of Patent: Jun. 21, 2016

(54) METHODS AND DEVICES FOR FORM-INDEPENDENT REGISTRATION OF FILLED-OUT CONTENT

(71) Applicant: Xerox Corporation, Norwalk, CT (US)

(72) Inventors: Safwan R Wshah, Webster, NY (US); Michael R Campanelli, Webster, NY (US)

(73) Assignee: Xerox Corporation, Norwalk, CT (US)

( * ) Notice: Subject to any disclaimer, the term of this patent is extended or adjusted under 35 U.S.C. 154(b) by 114 days.

(21) Appl. No.: 14/196,108

(22) Filed: Mar. 4, 2014

(65) Prior Publication Data

US 2015/0256712 A1    Sep. 10, 2015

(51) Int. Cl.
| | |
|---|---|
| *G06K 7/00* | (2006.01) |
| *G06K 9/20* | (2006.01) |
| *H04N 1/417* | (2006.01) |
| *G06K 9/00* | (2006.01) |

(52) U.S. Cl.
CPC ............... *H04N 1/4177* (2013.01); *G06K 9/00* (2013.01)

(58) Field of Classification Search
None
See application file for complete search history.

(56) References Cited

U.S. PATENT DOCUMENTS

| | | | | |
|---|---|---|---|---|
| 5,590,317 A | * | 12/1996 | Iguchi | G06F 17/30011 |
| 5,815,704 A | * | 9/1998 | Shimotsuji | G06F 17/2205 |
| | | | | 358/403 |
| 7,016,536 B1 | * | 3/2006 | Ling | G06T 5/006 |
| | | | | 382/190 |
| 7,694,217 B2 | * | 4/2010 | Croft | G06Q 10/10 |
| | | | | 715/229 |
| 2005/0219616 A1 | * | 10/2005 | Furuta | G06K 9/2054 |
| | | | | 358/1.18 |
| 2006/0059434 A1 | * | 3/2006 | Boss | G06F 21/46 |
| | | | | 715/780 |
| 2006/0168509 A1 | * | 7/2006 | Boss | G06F 17/243 |
| | | | | 715/226 |
| 2007/0253620 A1 | * | 11/2007 | Nagarajan | G06K 9/2054 |
| | | | | 382/164 |
| 2009/0204881 A1 | * | 8/2009 | Murthy | G06F 17/243 |
| | | | | 715/226 |
| 2011/0130501 A1 | * | 6/2011 | Prince | B29B 7/16 |
| | | | | 524/147 |
| 2013/0259388 A1 | * | 10/2013 | Yoshida | H04N 19/61 |
| | | | | 382/218 |
| 2015/0304521 A1 | * | 10/2015 | Campanelli | H04N 1/3876 |
| | | | | 358/1.18 |

OTHER PUBLICATIONS

Doermann, D.S.; Rosenfeld, Azriel, "The processing of form documents," in Document Analysis and Recognition, 1993., Proceedings of the Second International Conference on , vol., No., pp. 497-501, Oct. 20-22, 1993.*

* cited by examiner

*Primary Examiner* — Andrae S Allison
(74) *Attorney, Agent, or Firm* — Philip E. Blair; Fleit Gibbons Gutman Bongini & Bianco P.L.

(57) ABSTRACT

A device for registration of content in a filled-out application form is disclosed. The device is configured for scanning at least one portion of the filled-out application form. The device is configured for extracting filled-out content from the scanned form. The geometrical features of the master form are retrieved. The master form includes one or more anchor fields. Each anchor field has one or more anchor zones and at least one anchor segment. At least one anchor segment has global adjustment parameters and geometrical features. The extracted filled-out content is related to the retrieved geometrical features of a master form to create a new geometrical representation of the extracted filled-out content of the scanned application form. The new representation of the filled-out content based on the global adjustment parameters for the at least one anchor segment is globally adjusted. The globally adjusted filled-out content based on the geometrical features for the anchor segments is locally adjusted.

5 Claims, 11 Drawing Sheets

METHODS AND DEVICES FOR FORM-INDEPENDENT REGISTRATION OF FILLED-OUT CONTENT

TECHNICAL FIELD

The presently disclosed embodiments generally relate to registration of filled-out content of forms, and more specifically, to methods and devices for performing form-independent registration of the filled-out content.

BACKGROUND

Different services such as medical, business, banking, telecom, postal, etc. require a user to fill different types of forms to access the services. For example, in case of medical services, a user is required to fill forms such as HCFA, UB, pharmacy, etc. In case of banking services, for example, a customer fills new bank account opening form, etc. After filling these forms and required verification, service providers create an online repository for the filled-out forms. To perform this, a number of methods and devices/systems are available. One such method requires scanning of the filled-out forms. Scanning operation includes a number of steps. For example, sorting of the forms is performed in order to identify form type. Then, the forms are fed to the scanner to create an electronic copy. After scanning, the filled-out content in the electronic copy may however, be out of scale. In some instances, this positional irregularity of the filled-out content may become worse due to the extraction process of getting the form out of an envelope in which the form is delivered in. In such cases, the automated cutter may cut a paper fold line that requires an individual to tape the two pieces of the form back together with less than accurate precision. In addition, the high-speed scanning capture can add shift and rotation to the above problem.

Conventional arts involve various methods to solve the mentioned problems. One approach involves a method implemented for each form with significant field overlaps to accommodate positional shifts. However, the method still suffers from size and positional irregularity problem. In addition, each form type requires its own data detection.

Therefore, there exists a need for a method that solves the size and positional irregularity of the filled-out content of the electronic copy as well as align the filled-out content correctly in any form.

SUMMARY

The present disclosure discloses a device for registration of content of a filled-out application form. In an embodiment, the device is configured for scanning at least one portion of the filled-out application form. The device is configured for extracting filled-out content from the scanned form. The device is also configured to retrieve geometrical features of a master form. The master form includes one or more anchor fields. Each of the anchor fields has at least one anchor zone in the master form. The anchor zone has predefined geometrical features. The device is configured to relate the extracted filled-out content to the retrieved geometrical features of the master form to create a new geometrical representation of the extracted filled-out content of the scanned application form. The new representation of the filled-out content are globally adjusted based on the global adjustment parameters for the at least one anchor segment. The device adjusts the globally adjusted filled-out content locally based on the geometrical features for each segment and its neighbors.

In some embodiments, a method for global registration of filled-out content in an application form is disclosed. The method includes extraction of the filled-out content from the form. The extracted filled-out content is correlated to the geometrical features of the master form to create a new geometrical representation of the form. The master form includes one or more anchor fields. Each of the anchor field corresponds to one or more anchor zones and one or more anchor segments. The anchor segments have global adjustment parameters and geometrical features. The method includes determining anchor segments in the extracted content of the form. The anchor segments correspond to anchor zones in the form and the anchor zones are based on the anchor fields in the master form. The global adjustment parameters are determined for the anchor segments in the extracted content of the form. The global adjustment parameters in the extracted content of the form based on comparison of each of the anchor segments with the one or more anchor fields in the master form. A global score is determined for the adjusted global adjustment parameters. The method further includes adjusting the filled-out content in the form based on the global adjustment parameters having the highest global score for the anchor segments in the form.

In some embodiments, a method for local registration of filled-out content in an application form. The method includes retrieving geometrical features of a master form. Local registration shifts the globally registered segments to its correct position in the master form.

BRIEF DESCRIPTION OF THE DRAWINGS

FIGS. 3, 4, 5, 6, 7, 8, 9 illustrate examples of an original form, an extracted filled-out content, a master form, a comparison form (master form), a form with detected anchor segments, a globally-registered form, a filled-out form with locally registered content, according to one embodiment of the disclosed subject matter.

DETAILED DESCRIPTION

Figure 1:
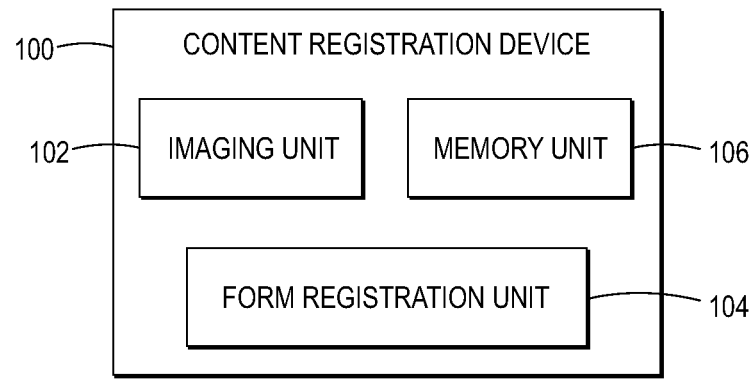
FIG. 1 illustrates an exemplary content registration device according to an embodiment of the disclosed subject matter.

The following detailed description is made with reference to the figures. Exemplary embodiments are described to illustrate the disclosure, not to limit its scope, which is defined by the claims. Those of ordinary skill in the art will recognize a number of equivalent variations in the description that follows.

Definitions

In various embodiments of the present disclosure, definitions of one or more terms that will be used in the document are described below. A filled-out form refers to a document that includes a number of fields and corresponding field values (or content), which are filled by a user. The field values of the filled-out form are extracted, thereby generating an extracted form that undergoes content registration. Content registration refers to shifting of the filled-out content to a particular position of the corresponding fields of a master form. The content registration is of two types—global registration and local registration. Global registration uniformly processes the filled-out content of the form and shifts the filled-out content globally. Local registration shifts each globally adjusted form segment to its master field independently. Master form is a form that is used as reference for registration of the filled-out content of the filled-out forms. Master form includes fields, anchor fields, anchor zone, having predetermined geometrical features and global adjustment parameters. Anchor field is a reference field whose geometrical features and global adjustment parameters are used as anchor to register other fields of the form. Anchor field is defined by an area called Anchor Zone. A number of anchor segments of the extracted form is searched in the anchor zones of the master form. Anchor Segment is a combination of similar and connected components. Geometrical features define dimensions of anchor zones. The dimensions include width, height, intersection, relative offset, etc. Global Adjustment parameters define parameters required for global registration. The parameters include scale, rotation and shift.

The numerous references in the disclosure to filled out forms are intended to cover any and/or all data provided on or otherwise input onto any document relevant to the applicable context, regardless of whether or not the same or the date is provided. Thus, the following references to filled-out forms that are filled-out completely, as well as forms that are only partially completed. Furthermore, the present disclosure discloses methods and devices for registering filled-out content of the filled-out forms.

Overview

Some of the disclosed embodiments relate to handling different types of filled-out forms for various services such as medical, banking, insurance, telecom, which may use different forms. For example for medical services, there may be a variety of forms such as pharmacy, HCFA, UB, etc. filled by a user. Physical copies of such forms are converted to electronic copies and are saved in a database for records. The filled-out content in the electronic copies need to be registered. Some embodiments of the disclosure involve global and local registration of the filled-out content in electronic copies of the physical filled-out forms. More particularly, the device utilizes a master form to perform global and local registration based upon geometrical features of the anchor points of the master form.

Exemplary Embodiment

FIG. 1 illustrates an exemplary content registration device 100, according to an exemplary embodiment of the subject matter. The "content registration device 100" may be referred as "device 100" hereinafter. The device 100 may be a portable or fixed device configured to perform a number of operations required for performing form-independent registration of filled-out content. Examples of the device 100 may include, but are not limited to, a mobile phone, a scanner, a laptop, a personal electronic assistant (PDA), etc.

According to one example, the device 100 may perform functions, without limitation, related to receiving physical copy of the filled-out forms, scanning or capturing the physical filled-out forms. The device 100 may perform additional activities including uploading the registered forms in an online repository, maintaining a database of the registered forms, and so on; however, these extraneous functions do not need to be necessarily related to other aspects of the present disclosure, and in fact can be completely unrelated to the rest of the disclosure. For simplicity, this disclosure is described in the context of the device 100 shown in FIG. 1, however, embodiments are intended to cover or otherwise include other types and/or combinations of multiple portable devices, such as a camera and a scanner and multiple fixed devices such as mainframe computers, fixed scanners, and so on.

In some embodiments, the device 100 may include an imaging unit 102, a memory unit 104, and a form-independent registration unit 106. The imaging unit 102 may be configured to generate an electronic copy of the physical filled-out form. In some embodiments, the imaging unit 102 may be configured to receive a physical copy of the filled-out form and scan the physical copy to retrieve a scanned image. In some other embodiments, the imaging unit 102 may be configured to capture a photo of the physical copy of the filled-out form, thereby generating a captured image of the physical copy of the filled-out form. In some embodiments, the captured image may be a collection of scanned images of portions of the filled-out form and/or the entire filled-out form. Examples of the imaging unit 102 may include, but are not limited to, a scanner, a mobile phone, a laptop with installed camera, a camera, etc. One of skill in the art will understand that, for some embodiments, the physical copy of the filled-out form has to be located at a reasonable distance from a scanning lens of the imaging unit 102, for capturing at least a standard quality image of the filled-out form.

The memory unit 104 may be configured to store master and final forms (discussed later in the detailed description). The memory unit 104 may be any type of database such as a relational database management system (RDMS), or other known types of storage devices, such as EEPROM, flash memory, cache memory, SD-RAM, and DDR-RAM, or other known types of storage devices.

Further, the form registration unit 106 may be configured to perform registration of the filled-out content of any filled-out form. In some embodiments, the form registration unit 106 may also scan or capture image of the physical copy of the filled-out form in addition to registration of the filled-out content. For example, a scanner may scan physical copy of the filled-out form to generate a scanned image of the filled-out form and perform registration of the filled-out content.

One of skill in the art will understand that the disclosed units of the device 100 may be present at one location. In some embodiments, the disclosed units may form a unitary unit. In some other embodiments, the disclosed units 100 may be present at different locations and may communicate to each other via a network. For example, the imaging unit 102 may scan a physical copy of the filled-out form, thereby generating a scanned image. The scanned image may be sent to the form registration unit 106 via the network. The form registration 106 may communicate with the memory unit 104 via the network for retrieval of the master form, and so on.

The network may be a wireless or a wired network, or a combination thereof. The network can be a collection of individual networks, interconnected with each other and functioning as a single large network (for example, the Internet or an intranet). Examples of network include, but are not limited to, Local Area Network (LAN), Wide Area Network (WAN), and so on.

In some embodiments, the disclosed units of the device 100 may function in a client-server model. In such model, any of three units may be at either a client site or a server site. The client site and the server site may be located at remote locations relative to each other. In some embodiments, the device 100 may be configured to operate in two modes, namely, a normal mode and an augmented reality mode. Both the modes are well known in the art.

For the sake of simplicity, the disclosure is described with the help of the device 100, but it must be noted that the device 100 can be a combination of one or more entities including server, end device/client, network, memory, etc.

Figure 2:
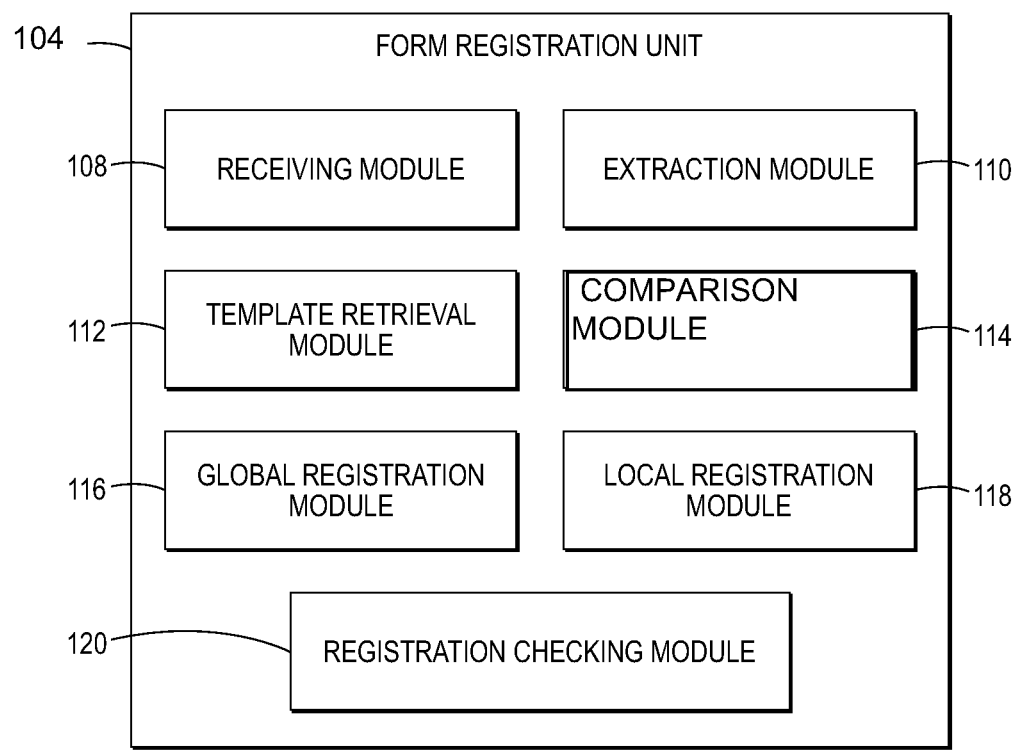
FIG. 2 illustrates an exemplary form-independent registration unit of the content registration device of FIG. 1 according to an embodiment of the disclosed subject matter.

FIG. 2 illustrates an exemplary form registration unit 106 of the device 100 of FIG. 1, according to the disclosure. In one embodiment, the form registration unit 106 includes a receiving module 108, an extraction module 110, a template retrieval module 112, a comparison module 114, a global registration module 116, and a local registration module 118.

The receiving module 108 may be configured to receive a scanned image or a captured image from the imaging unit (102 of FIG. 1). The receiving module 108 further sends the scanned image or captured image to the extraction module 110. In some embodiments, the receiving module 108 and the extraction module 110 may be unitary. The extraction module 110 may be configured to drop out color and background information from the scanned image or captured image by the methods that are already known in the art. The drop out color involves removal of a specific color from a scanned image, which is used particularly for preprinted forms so that the form itself does not appear in the scanned image, leaving only the information filled in by the user. This increases optical character recognition (OCR) effectiveness, and decreases data storage and bandwidth requirements. For example, UB medical form having background information such as field names, for example, Patient's name, DOB, etc. in red color is dropped out, generating an extracted image. The extracted image contains only the content that is filled-out in the fields of the scanned image or captured image. Further, the template retrieval module 112 retrieves the master form corresponding to the type of the filled-out form and the geometrical features of the master form from the memory unit 104. In some embodiments, the template retrieval module 112 may be a memory module storing the master form. In some embodiments, the template retrieval module 112 sends both the extracted filled-out content and the master to the comparison module 114.

In some embodiments, the comparison module 114 may be configured to receive the extracted filled-out content from the extraction module 110 and the geometrical features of the master form from the template retrieval module 112. For registering filled-out content of the filled-out forms, electronic copy having fields in a correct and proper format is needed. The electronic copy may be a master form having fields in a desired format and may act as a framework for registration. Thus, the comparison module 114 compares the geometrical features of the extracted filled-out content with the retrieved geometrical features of the master form, thereby creating a new geometrical representation of the extracted filled-out content of the scanned filled-out form. The filled-out content undergoes further processing of registration and is sent to the global registration module 116.

The global registration module 116 uniformly processes the filled-out content for registration. In some embodiments, the filled-out content undergoes vertical processing of registration, i.e., the filled-out content is scanned for registration from top to bottom. The global registration module 116 registers the filled-out content globally. The global registration module 116 determines anchor segments in the extracted filled-out content of the form using template-matching based approach. The template-matching based approach involves comparison of the geometrical features of the anchor fields, anchor zones, and anchor segments of the extracted content of the form with that of the master form. In some embodiments, the template-matching based approach involves comparison of the global adjustment parameters of the anchors of the extracted content of the form with that of the form. The global-adjusted form undergoes further local registration for more accurate and precision registration of the filled-out content.

The local registration module 118 may be configured to perform local registration of each global-adjusted segment of the global-adjusted form. The local registration module 118 shifts global-adjusted segments of the form to its master field independent of each other. The local registration module 118 determines geometrical features of the global-adjusted segments. The local registration module 118 determines a location in the global adjusted form using template-matching based approach. In some embodiments, the template-matching based approach involves comparison of the determined geometrical features of the global-adjusted segment and its neighboring global-adjusted segments in the global-adjusted form with that of the master form. In some embodiments, the local registration module 118 iterates local adjustment of each global-adjusted segment until all the global-adjusted segments are local-adjusted.

Exemplary Application Forms

Figure 3:
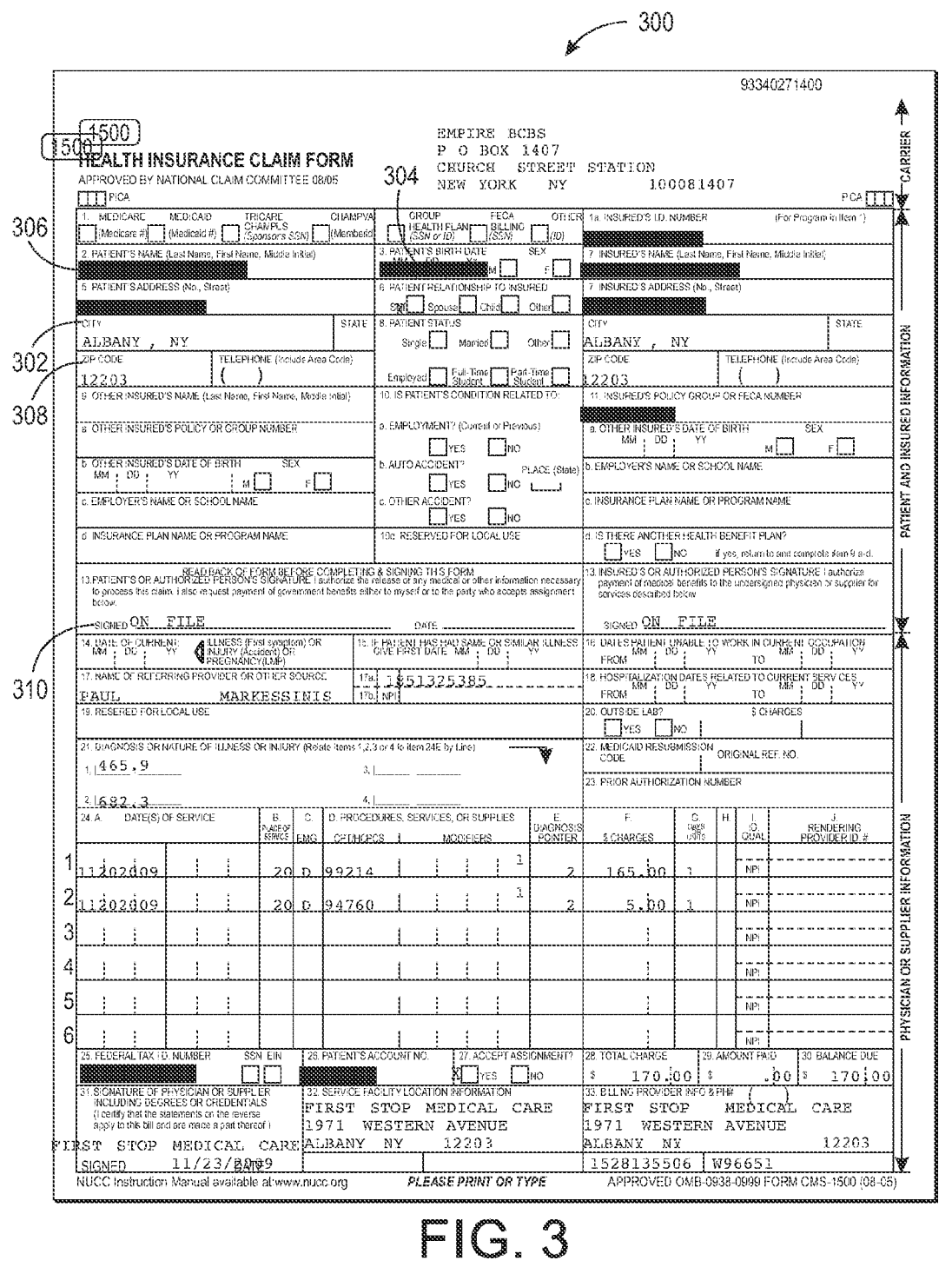

FIG. 3 illustrates an original form 300. The original form may be a physical copy of a filled-out form that is filled-out by a user. The physical filled-out form may be a preprinted document including a number of fields and space for field values to be filled by user. In some embodiments, the fields may be printed on a sheet of paper, a cardboard, a cellophane sheet, etc. In general, the form includes various fields, such as, "First Name", "Last Name", "Age", "Permanent Address", "Date of Birth", "Contact Number", or "Email Id". Some of the fields such as, "City", "Patient's birth date", "Patient's Address", "Zip Code", "signature of file" are marked as 302, 304, 306, 308, and 310, respectively, in FIG. 3. These fields constitute background information relating to a user/patient and is filled-out by the user.

Figure 4:
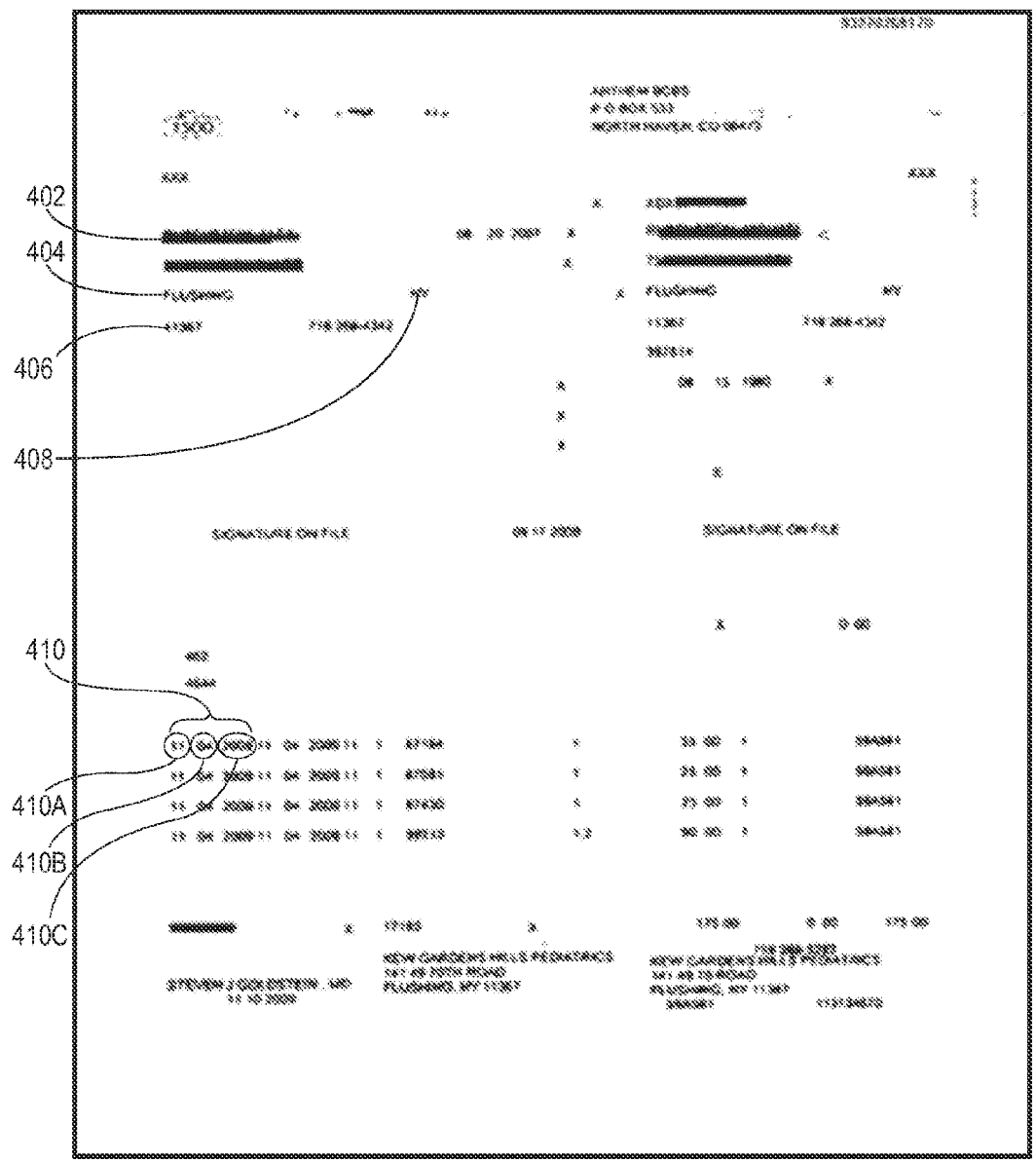

Referring to FIG. 4, the filled-out content may be extracted by the device 100, which is illustrated as extracted content 402 and 404. This extraction generally drops out color of the form and other background information (fields) of the form to achieve high clarity in the filled-out content, as discussed above. Each of the extracted data of the filled-out content is an anchor segment, for example, 402, 404, 406, 408, 410 and so on. In some embodiments, there are sub-anchor segments such as 410A, 410B, 410C, and so on. The filled-out form (FIG. 3) and the extracted filled-out content (FIG. 4) are merely provided for exemplary purposes, and are not intended to limit the scope of the disclosure in any way.

Figure 5:
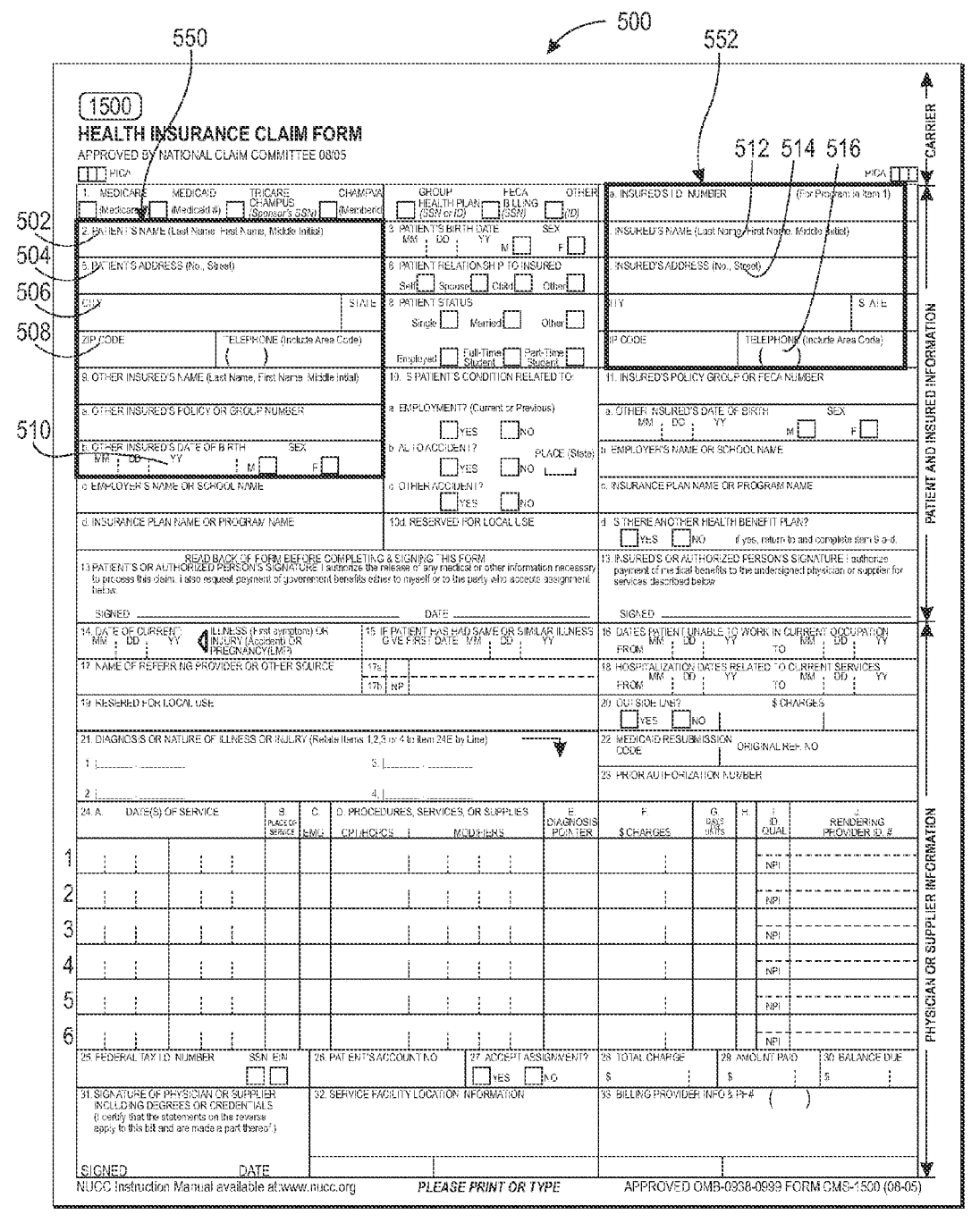

FIG. 5 illustrates an exemplary master form 500. The master form includes predefined anchor fields for example 502, 504, 506, 508, 510, and so on. Each of the anchor fields has an anchor zone. For example, the anchor fields 502, 504, 506, 508, 510 have an anchor zone represented by 550. In another example, the anchor fields 512, 514, 516 have an anchor zone 552. Each of the anchor fields, and the anchor zones of the master form has predefined geometrical features, and can be referenced for registering the filled-out content of the forms.

Figure 6:
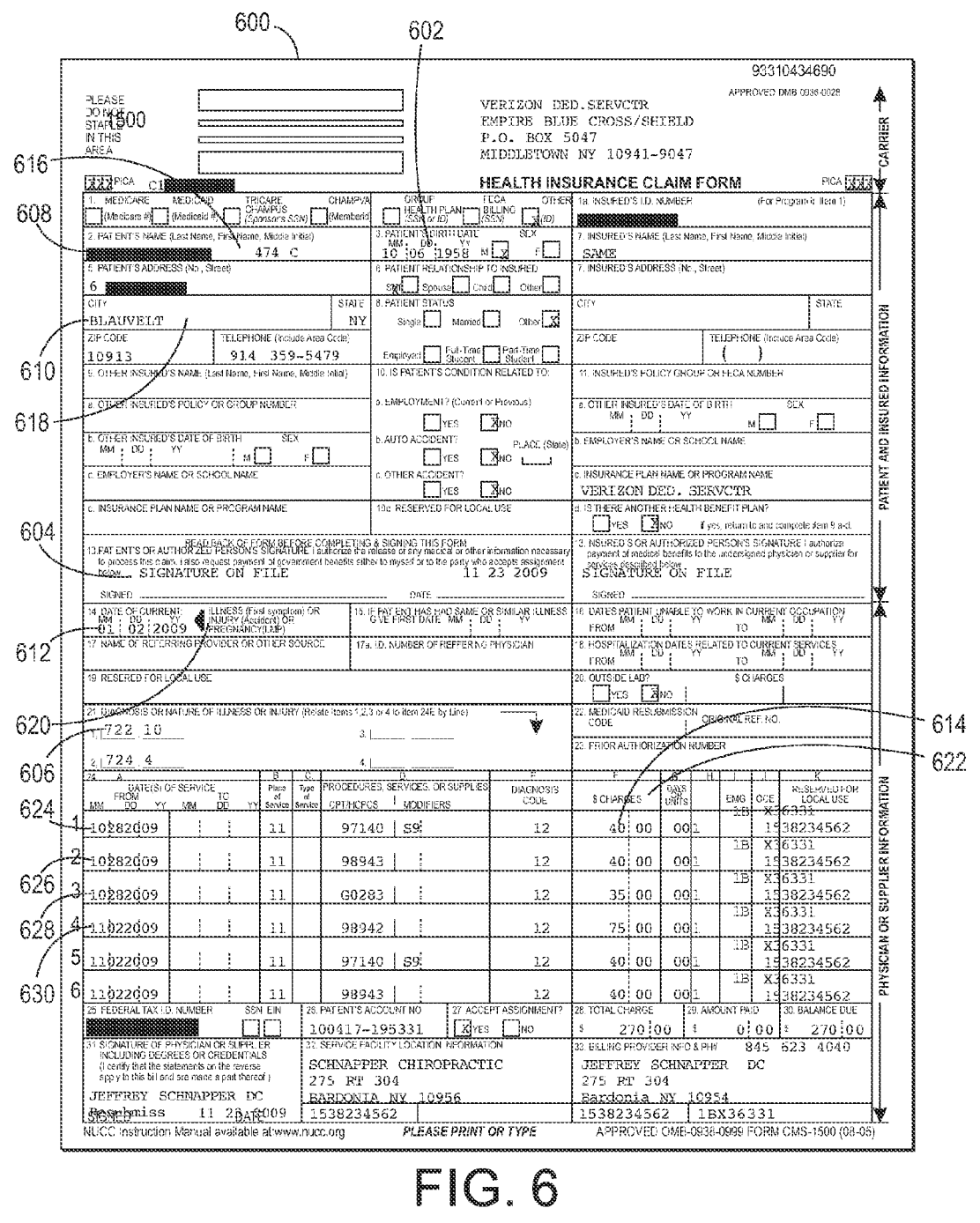

FIG. 6 illustrates an exemplary form 600, according to some embodiments of the disclosed subject matter. As discussed above, the geometrical features of the extracted filled-out content is compared with the geometrical features of the master form, thereby creating a new geometrical representation of the extracted filled-out content of the form 600. For example, "10 06 1958" referenced as 602, placed approximately below its field name "Birth date", and some other field names referenced as "Signature on File" 604, "722 10" 606. Also, some of the fields such as "Patient's name", "City", "Date of service", "S Charges" are identified as anchor fields and referenced as 608, 610, 612, 614, respectively. These fields are identified as anchor fields based upon the predetermined anchor points in the template form, i.e., the anchor points in the form 600 may be same as the anchor points in the master form. Each of the anchor fields is defined by an anchor zone. The anchor fields 608, 610, 612, 614 have corresponding anchor zones referenced as 616, 618, 620, 622, respectively. In each of the anchor zones, similar components combine to form anchor segments. For example, "MM", "DD", "YY" components are combined to form an anchor segment, anchor segments referenced as 624, 626, 628, 630 in FIG. 6. In some embodiments, the anchor zone may include more than one segment, for example the anchor field 608 may include 616, 610, 602 including 608 detected by template based approach as anchor segment.

Figure 7:
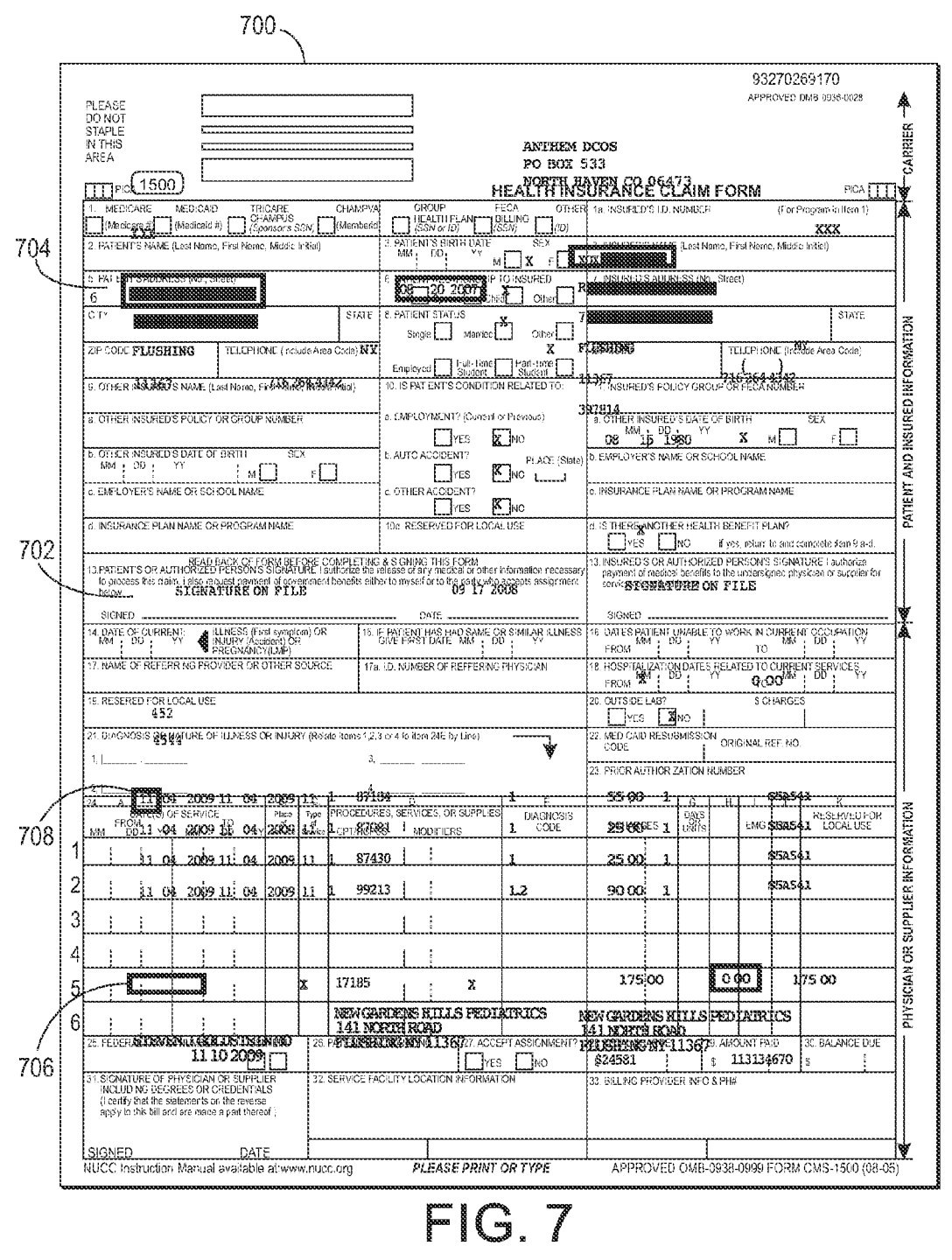

Referring to FIG. 7, the filled-out content is shifted globally as shown in the form 700. The global adjusted or shifted segments in the form 700 are indicated as 702, 704, 706, 708, and so on. The global registration is done basis global adjustment parameters of the anchors of the master form. Details of determining the global adjustment parameters are discussed below.

Figure 8:
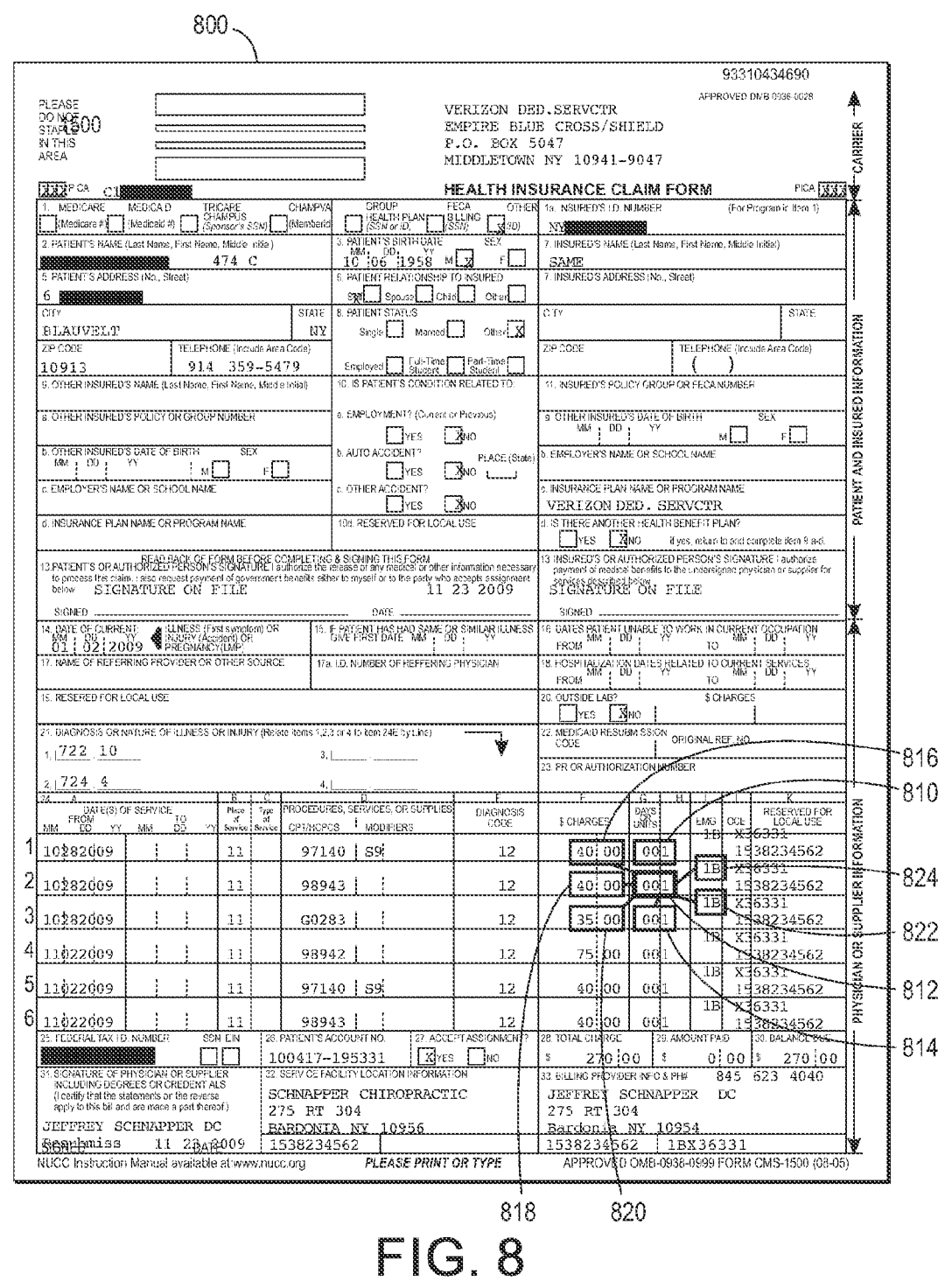
Figure 9:
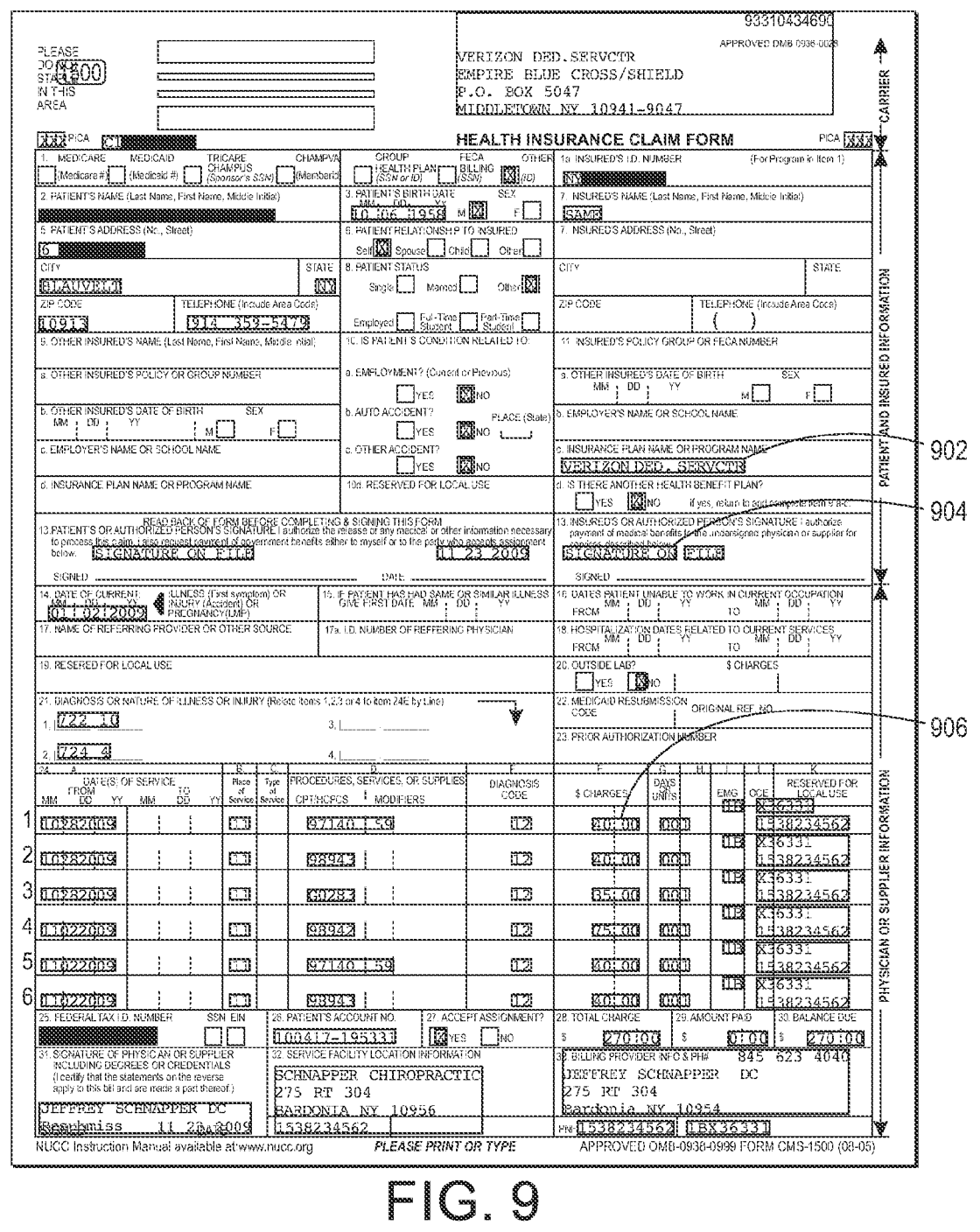

FIG. 8 illustrates an exemplary form 800 including local-adjusted content. The global-adjusted segments in the form 700 are further local-registered. Some of the examples of the local-registered segments are indicated as 802, 804, 806, 808, 810, and so on. After the global and local registrations, the form has complete filled-out content registered, as shown in FIG. 9. Some examples of the registered content are indicated as 902, 904, 906, and so on.

Figure 10:
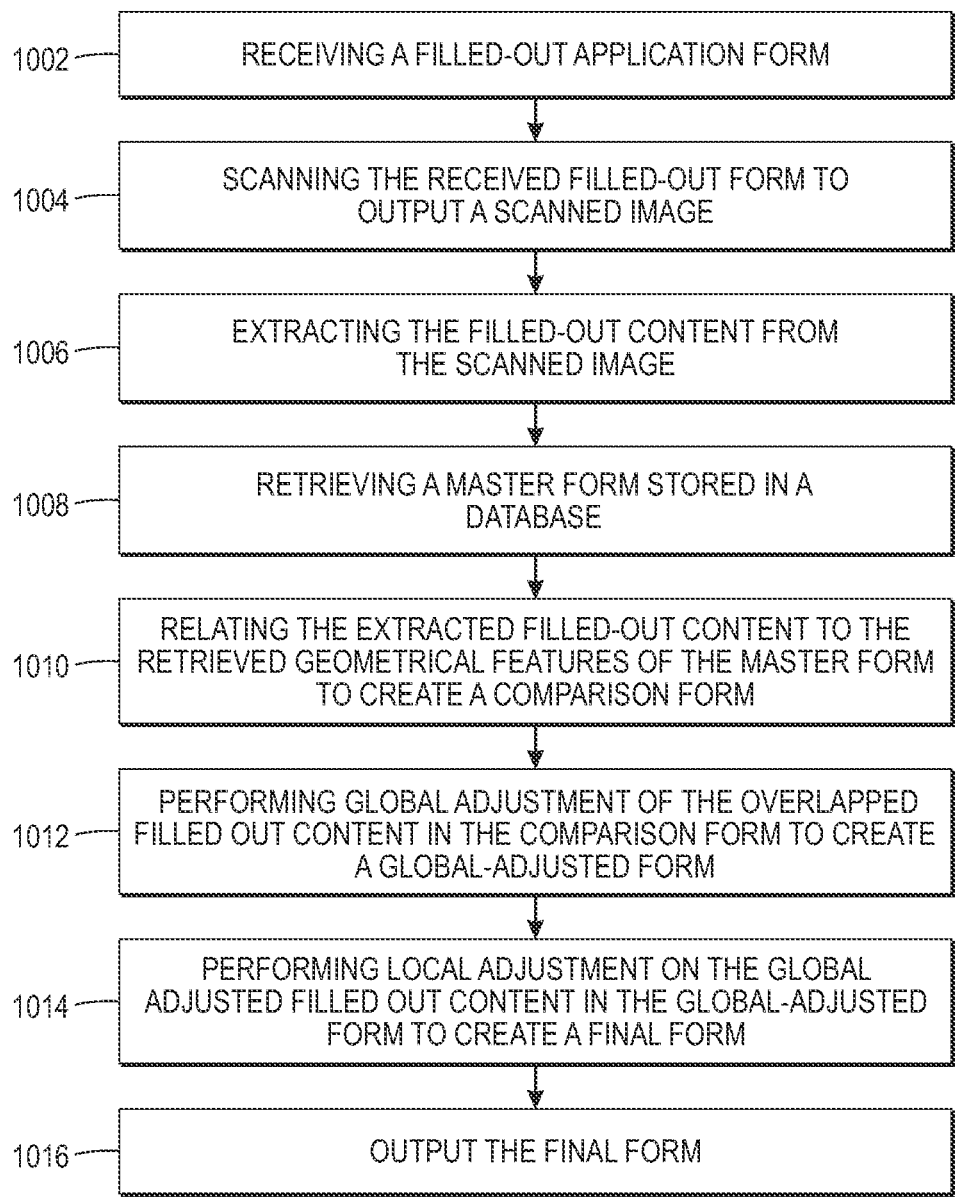
FIG. 10 is a flowchart of an exemplary method for form-independent registration of filled-out content, according to one embodiment of the disclosed subject matter.

FIG. 10 illustrates a method for registration of filled-out content of the forms, according to the disclosure. These exemplary methods may be described in the general context of computer executable instructions. Generally, computer executable instructions can include routines, programs, objects, components, data structures, procedures, modules, functions, and the like that perform particular functions or implement particular abstract data types. The computer executable instructions can be stored on a computer readable medium, and loaded or embedded in an appropriate device for execution.

The order in which the method is described is not intended to be construed as a limitation, and any number of the described method blocks can be combined or otherwise performed in any order to implement the method, or an alternate method. Additionally, individual blocks may be deleted from the method without departing from the spirit and scope of the subject matter described herein. Furthermore, the method can be implemented in any suitable hardware, software, firmware, or combination thereof, that exists in the related art or that is later developed.

The method describes, without limitation, implementation of the exemplary device 100 in a medical services scenario. One of skill in the art will understand that the method may be modified appropriately for implementation in a variety of medical or business service scenarios including those related to pharmacy, telecom, postal services, and so on, without departing from the scope and spirit of the disclosure.

At step 1002, the imaging unit 102 (shown in FIG. 1) receives a physical copy of the filled-out form. A user fills the field values in the filled-out form. In some instances, the user may fill the field values out of scale. For example, the user may fill his first name in the space for 'middle name' instead of the 'first name'. At step 1004, the imaging unit 102 scans the physical copy of the filled-out form to generate the scanned image. In case the imaging unit 102 is mobile, laptop, or camera, the camera captures photo of the physical copy of the filled-out form. After scanning, there may be instances in which the filled-out content may be out of scale. In addition, due to high speed scanning, the filled-out content may be rotated or skewed.

At step 1006, the extraction module 110 retrieves the scanned image or captured image from the imaging unit 102. The extraction module 110 drops out color of the scanned image. In some embodiments, the original form may be a master form. The filled-out form type, and the master form or original form are predefined. In some other embodiments, the extraction module 110 may drop out red color of the filled-out form by methods that are already known in the art. After drop out color scanning, the extracted image is generated. The extracted image includes only the filled-out content.

In some embodiments, the imaging unit 102 may generate the extracted filled-out content. In such a scenario, the first step 1002 of the method may be retrieval of the extracted filled-out content by the device 100. For example, the scanner may scan physical copy of the filled-out form and drop out color of the physical copy to form the extracted filled-out content. In some other examples, the mobile phone may capture photo of the physical copy of the filled-out form and the captured image may be fed to the extraction module 110 to generate the extracted filled-out content.

At step 1008, the geometrical features of the master form are retrieved from the memory unit 106. The master form is universal form, which can be referenced for all types of medical forms. The master form includes predetermined anchor fields, corresponding anchor zones and fields.

At step 1010, the geometrical features of the extracted filled-out content are compared with the retrieved geometrical features of the master template form to create a new representation of the extracted filled-out content of the form. The extracted filled-out content is registered with respect to the geometrical features of the fields of the master form.

At step 1012, the extracted filled-out content undergoes global registration. The global registration involves global adjustment of the filled-out content of the forms.

At step 1014, the form with global-adjusted content undergoes local registration. The local registration shifts global-adjusted segments to its master field independent of each other.

At step 1016, an electronic version of the filled-out form including retrieval of globally and locally registered content stored in the memory unit 106.

Figure 11:
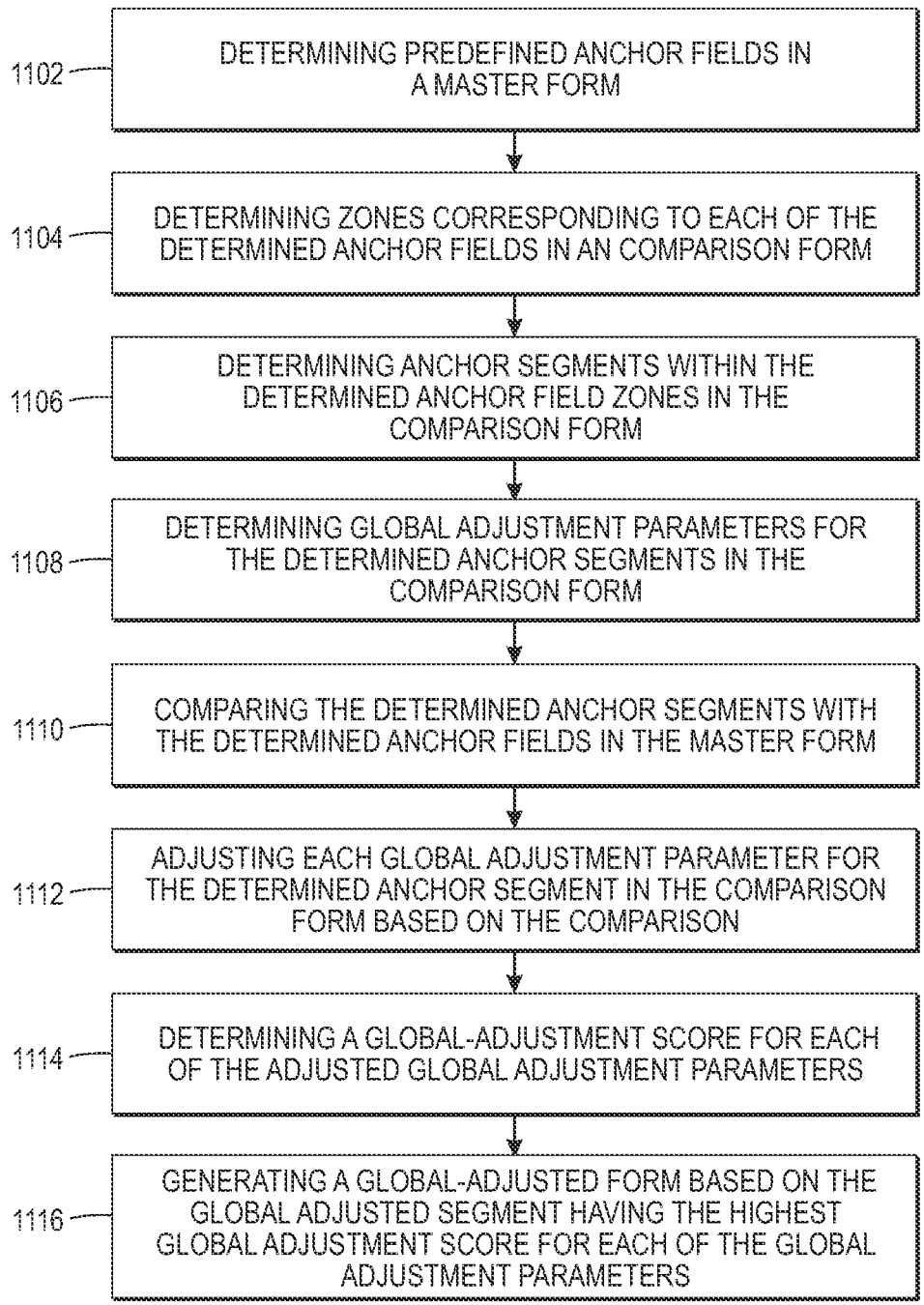
FIG. 11 is a flowchart of an exemplary method for form-independent global registration of filled-out content, according to one embodiment of the disclosed subject matter.

FIG. 11 illustrates an exemplary method for global registration of filled-out content of the forms, according to the disclosure. These exemplary methods may be described in the general context of computer executable instructions.

At step 1102, the anchor fields are predefined in the master form. The anchor field depicts empty box, for example, rectangular box of empty area of field of the master form. For example, a space where user fills his name for field 'Patient's name' is an anchor field, and an area around the anchor field is anchor zone. The global registration module 116 (of FIG. 2) determines predefined anchor fields of the master form. For example, Patient's name, DOB, Telephone number, etc. In some embodiments, at least three anchor fields are assumed in the master form as at least three anchor points are required to calculate global adjustment parameters. The global adjustment parameters may include but are not limited to shift, scale, and rotation. In some other embodiments, more than three anchor points may be selected as increase in the number of the anchors will increase the registration robustness.

In some embodiments, the anchor points defined in the master form may be sparse from each other so that geometrical features and global adjustment parameters of overall form can be estimated. In case two anchor fields are near to each other and one of the anchor fields is missed by the global registration module 116, the global registration module can still estimate geometrical features and global adjustment parameters of the missed neighboring anchor field. For example, if 'Patient's name' and 'sex' fields are neighbors, either of the two anchor fields can be considered.

Further, the anchor zone surrounds each of the anchor fields in the master form. The anchor zone defines an area around the anchor field. Each of the anchor zones in the master form has predetermined geometrical features. The geometrical features may include but are not limited to size, width, height, intersection, relative offset, etc.

At step 1104, the global registration module 116 determines anchor zones corresponding to each of the determined anchor fields of the master form, in the extracted filled-out content of the form. The anchor zones are determined in the form using template-matching based approach. The template-matching based approach involves matching the geometrical features of the anchor zones of the master form with that of the extracted filled-out content. While determining the anchor zones in the extracted filled-out content, the global registration module 116 scans the extracted filled-out content vertically, i.e., from top to bottom.

At step 1106, the anchor segments are determined within the determined anchor zone of the extracted filled-out content. The anchor segment is defined as combination of the similar and connected components into non-overlapped segments. For example, first name, middle name, last name are three similar components and are combined in one rectangular box, other examples are indicated as 624, 626, 628, 630 in FIG. 6. The anchor segments are formed to increase processing speed and to decrease processing time of the global registration module 116. In some instances, more than one anchor segment may be found in one anchor zone.

At step 1108, the global adjustment parameters for each of the anchor segments in the extracted filled-out content are determined. The global adjustment parameters include scale, rotation, and shift. Scale is calculated in terms of X and Y axis, rotation is calculated in degrees or any other angular unit, and shift is calculated in terms of units.

At step 1110, the global adjustment parameter of each of the anchor segments in the extracted filled-out content are compared with the global adjustment parameters of the fields in the master form. The master form has predefined global adjustment parameters of the fields.

At step 1112, the global adjustment parameter of each of the anchor segments is adjusted such that the particular anchor segment has same global adjustment parameter as that of the field of master form. Similar adjustment is done for all the anchor segments.

At step 1114, a global adjustment score is calculated based upon the measure by which the global adjustment parameter of the all adjusted segments. The global adjustment score is calculated and compared for all the anchor segments. In case of three sparse anchor points, only one global parameter is calculated that represent shift, rotate and scale, while in case of four sparse anchor points, four global registration parameters are calculated. Then the global adjustment score for each global registration parameter is calculated and maximum global adjustment score is chosen. Finally, a global-adjusted form is generated, thereby having global-adjusted content.

At step 1116, the global adjustment parameters are predefined for all the anchors of the master form. The global adjustment parameters of each of the three anchors of the extracted filled-out content are compared with the global adjustment parameters for each of the three anchors followed by selecting the global adjustment parameter having global adjustment score. For first anchor, all the segments of the extracted filled-out content are shifted basis the difference between the global adjustment parameters of the anchors of the master form and the filled-out form, at step 1110. Similarly, global adjustment is applied for the remaining global adjustment parameters for the remaining anchors of the filled-out form. In some embodiments, more the number of anchors, more permutations for global adjustment of the anchor segments, which may increase accuracy as well as processing time.

Figure 12:
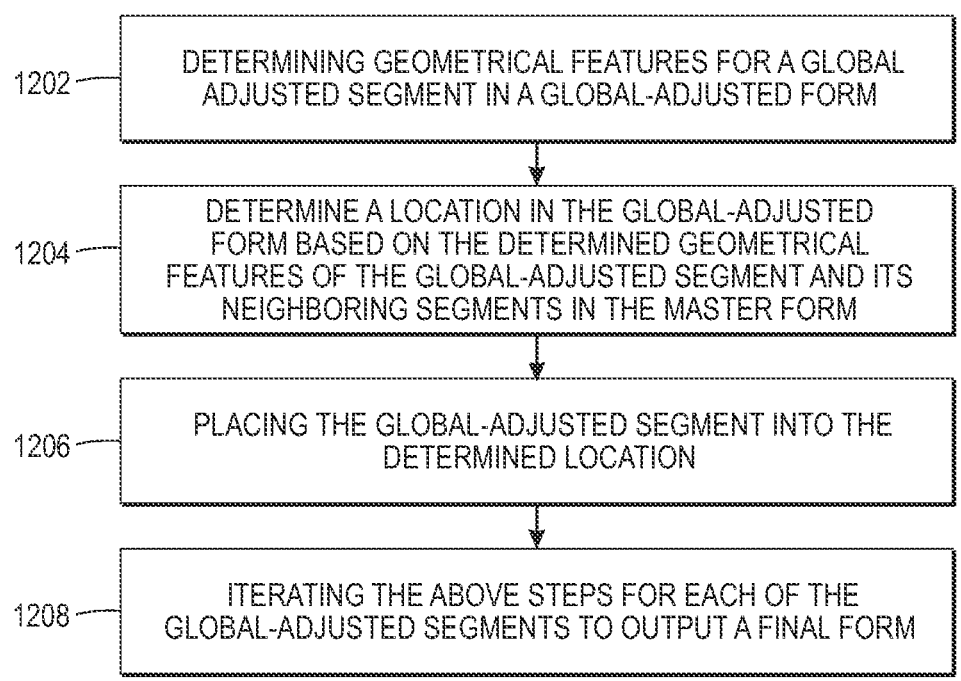
FIG. 12 is a flowchart of an exemplary method for form-independent local registration of filled-out content, according to one embodiment of the disclosed subject matter.

FIG. 12 illustrates an exemplary method for local registration of filled-out content of the forms, according to the disclosure. These exemplary methods may be described in the general context of computer executable instructions.

At step 1202, the local registration module 118 determines geometrical features of all the globally adjusted segments in the global-adjusted form. The geometrical features include area, width, height, intersecting, relative offset, etc. The master form has predefined geometrical features of the anchor fields along with its neighbors.

At step 1204, each global-adjusted segment along with its neighboring global-adjusted segments are selected. Best location of the global adjusted segment in the global-adjusted form is determined by comparing the determined geometrical features of the global-adjusted segments and its neighbors with that of the master form. During shifting, if all the global-adjusted segments shift differently in different positions, it means they are at right position.

In some embodiments, there may be a particular segment for a number of times in the global-adjusted segment, which needs to be local-adjusted. For example, there may be DDM-MYYYY for a number of times in the form. To know which DDMMYYYY needs to be adjusted, geometrical features of each element DDMMYYYY along its neighbors are compared with geometrical features of a particular DDM-MYYYY in the master form. The best matching segment is found, at step 1204. The best matching segment shifted by a difference in number of units by subtracting geometrical features of the best matching segment of the form from the geometrical features of the particular segment of the master form. This step is performed for each segment.

At step 1206, all the global-adjusted segments are shifted independently of each other based on the best location determined in step 1204.

At step 1208, the form is scanned if all the global-adjusted segments are locally shifted. In some instances, some of the global-adjusted segments may not be registered locally. For example, there are two segments—X and Y. Y-segment is in x-field and X-segment is out of its x-field. The X-segment cannot be shifted in its x-field as the x-field is already occupied by the Y-segment. So, in first instance, the X-segment may remain unshifted and Y-segment may be shifted to its right location. Now, the x-field is empty and the X-segment may be shifted to its right location, i.e., x-field. The registration-checking module 120 detects such unregistered segments. Such segments undergo local registration as explained above. Finally, the final form with globally and locally registered content is output and uploaded in a database or memory unit 106.

The present disclosure is provided in the context of methods and devices for registration of filled-out content in the forms. Some of the disclosed embodiments reduce the overall processing time. Some of the disclosed embodiments has competitive speed for high volume of filled-out forms. Apart from increased efficiency, some of the disclosed embodiments removes noise and corrects skewing of the filled-out content.

What is claimed is:

1. A document content registration system comprising:
    an imaging unit for scanning at least one portion of a form containing content comprising a plurality of fields and corresponding field values which have been filled into said fields, and generating a scanned form;
    an extraction module for receiving said scanned form from said imaging unit and for extracting only content from said scanned form with field values that have been filled-in, said extraction module dropping out color and background from said scanned form, and generating an extracted image;
    a template retrieval module for retrieving geometrical features of a master form comprising, at least in part, predetermined anchor fields each corresponding to at least one anchor zone and at least one-anchor segment, said anchor fields and anchor zones having global adjustment parameters comprising scale, rotation and shift and geometrical features which define dimensions of said anchor zones, said master form being a universal form which can be referenced for a plurality of different forms;
    a comparison module receiving said extracted image from said extraction module and said geometrical features of said master form from said template retrieval module, and comparing geometrical features of said anchor segments of said scanned form with corresponding anchor fields in said master form to create a new geometrical representation of said extracted content of said scanned form;
    a global registration module for globally adjusting said new geometrical representation of said content based on global adjustment parameters of said anchor fields and anchor zones, said global registration module producing a globally adjusted form; and
    a local registration module for performing location registration on said globally adjusted form, said registration comprising iteratively adjusting of each of said globally adjusted segments until all segments have been locally adjusted, said adjustment being based on said geometrical features for said content.

2. The document content registration system of claim 1, further comprising a receiving module for receiving said scanned image from said scanning unit and for providing said received scanned image to said extraction module.

3. The document content registration system of claim 1, wherein said template retrieval module is a memory module.

4. The document content registration system of claim 1, wherein said template retrieval module sends both said extracted form and said retrieved master form to said comparison module.

5. A method for document content registration comprising:
    scanning, by an imaging unit, at least one portion of a form containing content comprising a plurality of fields and corresponding field values which have been filled into said fields, to generate a scanned form;
    receiving, by an extraction module, said scanned form from said imaging unit and extracting content from said scanned form, said extraction module dropping out color and background from said scanned form, and generating an extracted image containing only content with field values that have been filled-in;
    receiving, by an extraction module, said scanned form and extracting content from said scanned form, said extraction module dropping out color and background information from said scanned form, and generating an extracted image containing only content with field values that have been filled-in, said extracted image to undergo content registration;
    retrieving, by a template retrieval module, geometrical features of a master form comprising, at least in part, predetermined anchor fields each corresponding to at least one anchor zone and at least one anchor segment, said anchor fields and anchor zones having global adjustment parameters comprising scale, rotation and shift and gometrical features which define dimensions of said anchor zones, said master form being a universal form which can be referenced for a plurality of different forms;
    receiving, by a comparison module, said extracted image from said extraction module and said geometrical features of said master form from said template retrieval module, and comparing geometrical features of said anchor segments of said scanned form with corresponding anchor fields in said master form to create a new geometrical representation of said extracted content of said scanned form;
    globally adjusting, by a global registration module, said new geometrical representation of said content based on global adjustment parameters of said anchor fields and anchor zones, said global registration module producing a globally adjusted form; and
    iteratively adjusting, by a local registration module, each of said globally adjusted segments until all segments have been locally adjusted, said adjustment being based on said geometrical features for said content.

* * * * *